United States Patent [19]

Filatovs et al.

[11] Patent Number: 4,504,557
[45] Date of Patent: Mar. 12, 1985

[54] ELECTRICAL ENERGY STORAGE

[75] Inventors: George J. Filatovs, Greensboro, N.C.; John E. McGinness, Houston, Tex.

[73] Assignee: MB-80 Energy Corporation, Houston, Tex.

[21] Appl. No.: 528,179

[22] Filed: Aug. 31, 1983

[51] Int. Cl.³ .............................................. H01M 4/60
[52] U.S. Cl. .................................... 429/192; 429/213; 252/182.1
[58] Field of Search ............... 429/188, 212, 213, 215, 429/249, 42, 43, 192; 252/182.1

[56] References Cited

U.S. PATENT DOCUMENTS 4,366,216 12/1982 McGinness ........................ 429/213

FOREIGN PATENT DOCUMENTS 1216549 12/1970 United Kingdom ................ 429/213

OTHER PUBLICATIONS

*Chemical Abstracts:* Fitzpatrick et al., vol. 76, 112,414(p), 1972.
*Chemical Abstracts:* Moskovtsev et al., vol. 87, 169,417(y), 1977.
*Chemical Abstracts:* Gurgenidze et al., vol. 84, 46,359(m), 1976.

*Primary Examiner*—Donald L. Walton
*Attorney, Agent, or Firm*—Epstein & Edell

[57] ABSTRACT

Storage of electrical energy in an oxidation-reduction polymer material is optimized when the material is lignin and/or hydrazine is added to the material so as to facilitate bonding of the material to graphite. A preferred embodiment of the invention includes a storage device having an electron acceptor component separated from an electron donor component by a barrier which is impregnated with an electrolyte so as to electrically separate the two components while serving as an ion conduit. At least one of the layers includes an oxidation-reduction polymer material which either is lignin or is mixed with hydrazine, or both. The preferred energy storage material is a mixture of lignin, hydrazine and graphite, the latter being either added to the mixture or formed by graphitization upon heating of the lignin.

32 Claims, 1 Drawing Figure

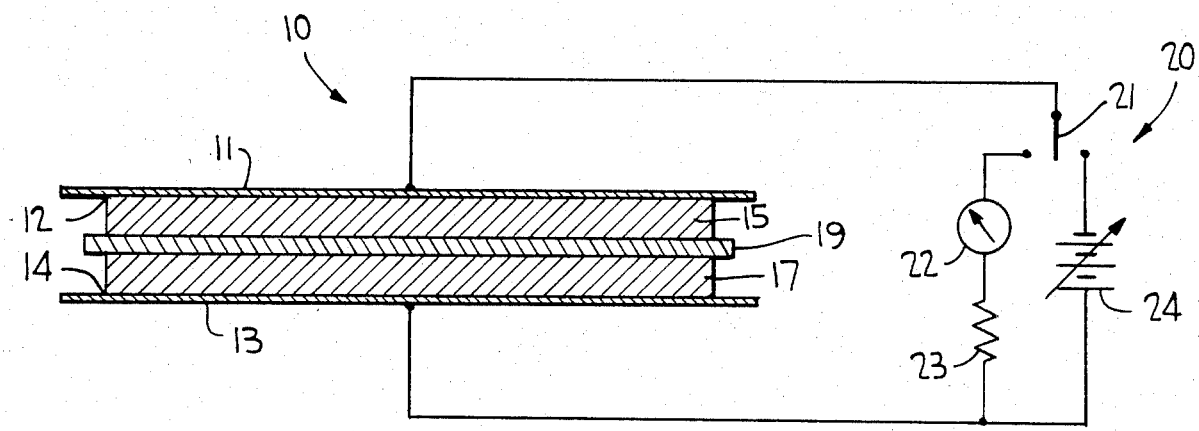

ELECTRICAL ENERGY STORAGE

BACKGROUND OF THE INVENTION

1. Field of the Invention

The present invention relates to devices and methods for storing electrical energy using organic materials. More particularly, the invention relates to energy storage in a device which in part comprises organic semiconducting materials derived by modifying existing polymers or cross-linking monomers such that they are capable of functioning as electron donors or acceptors so as to form an assembly which can be repeatedly charged with and discharge electrical energy. The present invention is an improvement of the device described and claimed in U.S. Pat. No. 4,366,216 to McGinness, the disclosure of which is expressly incorporated herein by reference in its entirety.

2. Discussion of the Prior Art

Storage of electrical energy occurs through electron-transfer reactions which permit the extraction and addition of electrons through an external circuit. Various methods of storing and extracting this energy have been the focus of considerable research and development which have taken many approaches, each with individual success and compromise. Prior to the present invention, electrical energy storage systems have been devised at various levels of sophistication, each with sufficient shortcomings to render further research and development necessary.

It is known in the prior art that semiconducting materials may be employed as electron donors or acceptors. However, the operation of such devices is not fully understood and their utilization has been limited chiefly as electron acceptors (i.e. cathodes) in primary cells, primarily the halogen-organic charge transfer complexes. Moreover, the organic complex cathodes are usually coupled with inorganic anodes such as lithium. Although such batteries have high power and current characteristics and reasonably long storage life, they suffer from the disadvantages of high manufacturing cost, toxicity during manufacture and disposal, and dependence on scarce strategic materials.

A promising breakthrough in electrical energy storage has been described in the aforementioned McGinness patent which discloses the use of an oxidation-reduction polymer material, such as a polymer of quinone, semiquinone and hydroquinone units, as a storage device. The oxidation-reduction polymer when operated in the solid state was found to have extremely fast charge time (on the order of twenty times faster than ionic electrical energy storage devices) at the proper static dielectric constant while eliminating the requirements for consumable electrodes and liquid phase materials. In addition, such storage devices have extremely long lifetimes permitting, in theory, limitless charging and discharging cycles. Moreover, the oxidation-reduction polymer material storage device can be made of light weight non-toxic materials and can deliver electrical energy comparable to that of a conventional ionic battery but using a device of substantially less size and weight. The oxidation-reduction polymer materials disclosed in the McGinness patent include melanins, a polymer which is polymerized from hydroquinone and diethylamine, and others. We have found, however, that the performance characteristics of the energy storage device can be considerably improved if other oxidation-reduction polymer materials are employed or if the materials are treated in a particular manner. In particular, the energy density is improved by over two orders of magnitude.

SUMMARY OF THE INVENTION

Accordingly, it is the primary object of the present invention to provide an improvement of the electrical energy storage methods and apparatus described in the aforementioned McGinness patent.

Another object of the present invention is to provide an energy storage device employing an oxidation-reduction polymer material which is available in large quantities and at very low cost.

A further object of the present invention is to provide an energy storage device having electron donor and acceptor components, at least one of which is an organic semiconducting compound, the components being separated by a barrier which is impregnated with an electrolyte and which electrically separates the active donor and acceptor materials while acting as an ion conduit.

A still further object of the present invention is to provide an electrical energy storage device which includes a pair of spaced electrodes and storage means including an oxidation-reduction polymer material coupled between the electrodes and arranged to store electrical energy in response to passage of electrical current therethrough, and wherein at least one component of the polymer material is lignin.

The present invention has another object in that the aforesaid device includes additive means mixed with the polymer material for bonding the polymer material to graphite in the mixture so as to thereby increase conductivity of the material. In the preferred embodiment, the additive means comprises a hydrazine.

Another object of the present invention is to provide a rechargeable electrical energy storage device having a pair of spaced electrodes and storage means in the form of an oxidation-reduction polymer material coupled between the electrodes and mixed with a hydrazine.

One aspect of the present invention is characterized by the use of the natural polymer lignin as the oxidation-reduction polymer material in an energy storage device. While various lignin material has been utilized in battery systems in the prior art, such use has been limited to serving as fillers and expanders, passivating agents, antioxidants, etc. There is no recognition in the prior art that lignin may be utilized as a solid state electrical energy storage agent, in that it contains an unusually anodic functional group which can either be blocked or destroyed by titrating acid with HCl. Finally we have found that other naturally occuring substances such as squid melanin or melanosomes may also contain these functional groups.

In another aspect of the present invention an oxidation-reduction polymer has its energy storage capability improved dramatically when it is mixed with a hydrazine or other reducing agent. Specifically, the hydrazine functions as an anodic functional group when connected to the conjugated polymer structure, the activity of the functional groups being enhanced by the double bond structures in its vicinity. In addition, the hydrazine serves as a molecular solder which connects the polymer to the electrode of the storage device. The combination of increased conductivity and enhanced bonding to the electrode renders the hydrazine ideally suitable as a component of the mixture which comprises the energy storage material.

BRIEF DESCRIPTION OF THE DRAWINGS

These and other objects, features and many of the attendant advantages of the invention will be better understood upon a reading of the following detailed description when considered in conjunction with the accompanying drawing.

The FIGURE is a diagrammatic illustration of one form of the energy storage device of the present invention.

DESCRIPTION OF PREFERRED EMBODIMENTS

The present invention is based on the discovery that lignin, a naturally occurring polymer, is particularly useful for storing electrical energy. As noted above, lignin has been used in batteries in the prior art, but only as fillers, expanders, passivating agents, anti-oxidants, etc. It turns out, however, that lignin can be charged by a charging current so as to store electrical energy which can be used to drive a load.

Lignin is the major non-cellulosic component of wood. In a broader sense, the term lignin is a generic term which includes other lignin-containing products such as various paper mill products and effluence, black liquor, commercial lignin and even ground-up newsprint. The term lignin as used herein is evident from this context. In general, the present invention operates most efficiently with the purest form of lignin available; however, one of the advantages of the present invention resides in the fact that it is capable of utilizing almost any form of lignin. Due to the broad range of chemical purities in the various aforementioned lignin products, the necessary modifying treatments and resultant electronic characteristics may vary. As expected, performance degrades as the lignin becomes more impure.

In its isolated form, lignin includes many randomly bonded and cross-linked units, forming macro-molecules with a formula of the family $OCH_3$-$C_6O_2(CH)_nSH$. Lignins are not a chemical compound but a material which is statistically describable in terms of the concentration of functional groups and the kind and frequency of interunit linkages. The average lignin is known to contain aromatic rings with a side chain, one or two methoxyls, a phenolic hydroxyl or phenol ether. Prominent configurations in the chemical structure are the quinoid charge transfer complexes. While quinoid materials have been previously explored for use as energy storage materials as described in the aforementioned McGinness patent, it is the source (i.e. lignin) and modifications of these materials as part of the present invention which makes them more viable as energy storage devices.

The present invention is also based on the discovery of the aforesaid modifications to the polymer materials so as to make them more viable for the intended purpose. One of the principal agents in modifying the polymers according to the present invention is hydrazine. Hydrazine has heretofore been widely used for such functions as fuel cell materials and immunology research to bond tyrosine residues to plastic for mechanical adherance. It has been found, however, that hydrazine will bond a variety of quinones to graphite with resulting increase in conductivity. Specifically, hydrazine is employed with the oxidation-reduction polymer in accordance with the present invention for two distinct purposes: (1) the addition of electron-repelling groups to render the base polymer more anodic; and (2) as a molecular solder connecting the polymer to an ohmic electrode. More specifically, it has been found that 2,4-dinitrophenyl hydrazine can be mixed with an oxidation-reduction polymer such that the hydrazine functions as an anodic functional group when connected to the conjugated (phenyl) ring structure. The activity of the functional groups is enhanced by the double-bond structure in its vicinity.

Although, in accordance with the present invention, lignin can be employed in the non-barrier and barrier structural embodiments of the aforesaid McGinness patent, and although, in accordance with the present invention, oxidation-reduction polymers in general may be mixed with hydrazine in the non-barrier and barrier structural embodiments of the aforesaid McGinness patent, it has been found that the structure illustrated in the accompany drawing is particularly suitable for electrical energy storage devices. Referring to that drawing, an electrical energy storage device 10 includes collector electrodes 11 and 13 which form ohmic interfaces 12 and 14 with respective electron acceptor 15 and electron donor 17 components, respectively. A barrier 19 is disposed between the electron acceptor 15 and the electron donor 17 and is impregnated with an electrolyte. Barrier 19 serves to separate the active materials of components 15 and 17 into two compartments while acting as an ion conduit therebetween. An external circuit 20 operates to withdraw or introduce electrons into the active material in components 15 and 17. Specifically, series-connected ammeter 22 and resistor 23 are selectively connected across collector electrodes 11 and 13 by a switch 21 in one of its positions. A charging circuit, including a variable voltage source 24., is selectively connected across these electrodes in another position of switch 21.

As noted above, the present invention involves certain modifications which can render an organic semiconducting polymer containing quinoid subunits suitable as an electron donor or acceptor. Moreover, as noted above, the present invention recognizes that there is a plentiful and natural source of such polymer, namely lignin. These materials can be made to function as one or both of the components 15, 17, depending upon the chemical and physical modifications employed. In addition, these materials can be made so as to acquire characteristics which compensate for some of their shortcomings.

The electro-chemical properties of organic semiconducting materials lack adequate theoretical description. General interpretations and understandings arise from a combination of considerations based on solid state physics, chemistry and structure. Therefore, the operational theory described hereinbelow is only theory and is intended to be illustrative of the present understanding of the invention operation. In addition, there are simply too many possible variations in the structure, detail and composition of the materials employed in the invention to provide an exact theory which covers all of the possibilities.

The discussion which follows inherently includes the role played in the invention by oxygen (present primarily in the form of lone pair states, such as in quinones) nitrogen (present primarily in hydrazine) and sulfur (present primarily in sulfimides, sulfonation and sulfhidrals). Moreover, it should be recognized that elements of higher order in the chemical periodic table may function similarly.

The polymeric semiconductive materials which may be employed in energy storage devices in accordance with the present invention contain both modifications to the quinone structure and additional sub-units. When an electrical current is passed through the material, certain sites in the material can accept or donate electrons while simultaneously reacting with ions, depending upon the free energy states of the sites before and after the accepting-donating event. When the device is charged from the external circuit 20, higher energy states are created which can later drive an internal ionic and external electric current when the device is later discharged through a load. In this regard, the standard battery terminology of cathode and anode are most applicable when considering events external to the energy source device. Internal events can include charge gradients, counter ions, charge transfer complexes, etc., which render some terminology unclear. In some contexts the terms anode and cathode are useful, such as the reference to potential voltage levels described below.

Pure quinones have an electrical potential of 0.7 volts with respect to hydrogen making them cathodic-electron acceptors with respect to the standard inorganic battery materials, such as zinc. Hydroquinones are anodic toward hydrogen and donate electrons to strong electron acceptors. For a battery to be constructed entirely of quinone and hydroquinone units, the electrical potentials must be changed. The alterations possible are substituents and modifications to the rings and to the non-ring groups. The effect of these can be followed qualitatively as alterations in electron density in the vicinity of oxidizable or reduceable groups. The effect is greatest in alterations of the quinone ring. Quinone is ordinarily cathodic and accepts electrons when it is reduced to hydroquinone. The effects of substituents on the ring are that electron-attracting groups decrease electron density in the vicinity of oxygen, rendering the compound a stronger oxidizing agent. Electron-repelling groups have the opposite effect.

Hydroquinone is normally anodic and donates electrons when oxidized to quinone. The effect of ring substituents is that the anodic potential is raised if there is a higher electron density, for example, by adding electron-repelling groups, in the vicinity of an oxidizable group. Alternatively, the ring substituents make the compound a stronger reducing agent by rendering the compound more weakly aromatic.

Finally, the voltage obtained with graphite as the ohmic contact is anomalously high and can exceed 2.5 V in contrast to metal ohmic contacts which provide potentials which correlate with the 0.7 volt contribution expected from quinones and yields 1.4 V with zinc.

The general theory of operation within the oxidation-reduction polymer material used for electron acceptor 15, electron donor 17, or both, is described in detail in the aforementioned McGinness patent and is not repeated herein. The present invention is best illustrated by means of the following examples which show the preparation of oxidation-reduction polymers for use in electrical storage devices, including the device shown in the accompanying drawing, according to the present invention:

EXAMPLE I

An energy storage device was constructed using typical pulp mill black liquor (lignin) at 20% hydration. Black liquor paste was spread on a 32 mm graphite disc and was in turn covered with a thin paste of zinc chloride. The combined pastes were then covered with a 32 mm diameter zinc disc, forming a device in the form of a sandwich of graphite/black liquor/salt/zinc. The device was charged at 1 ampere for four ten-second cycles. The decay voltage was monitored and, after the fourth cycle, stabilized. The device was discharged and then charged at 200 mA for one minute. The resultant total efficiency (available stored energy versus charging energy) was 12% and the energy density was 125 M Joules/m$^3$. The average potential was 1.8 volts. The short circuit current was 150MA.

EXAMPLE II

An energy storage device was constructed as in Example I with the addition of a Celgard microporous film (Celanese Fibers Marketing Co.) serving as barrier 19 of the drawing. The liquor/zinc chloride mixture was spread on the zinc disc, covered with the Celgard film; liquor alone was spread on the other side of the film, and covered with a graphite disc. (Devices in which zinc chloride was used without liquor on the zinc disc component did not function as well as a mixture of zinc chloride with liquor.) This energy storage device had energy densities of over 100 M Joules/m$^3$, with increased total efficiency, typically above 30%, and a significantly reduced voltage decay rate.

EXAMPLE III

An energy storage device was constructed by layering a 0.05 mm black liquor coat on a 32 mm graphite disc, placing a Celgard film on top, and layering a 0.05 mm coat of hydra- zine-monohydrate treated liquor. A 32 mm graphite disc was placed on top of this as an ohmic contact. (The liquor was treated with hydrazine by mixing 500 mg (at a pH 10.6) of liquor with 750 mg of hydrazine and heating the resulting liquor at 60° C. for ten minutes.) The charging process evaporated excess liquid; further, the discharge characteristics showed that the liquor was modified such that it was capable of acting as an electron acceptor toward untreated liquor. The initial polarity of the energy storage device was negative with the liquor at pH 12.6, acting cathodic with regard to the liquor with pH 10.5. (The addition of hydrazine monohydrate makes the liquor more basic.) The charging current reversed this polarity. However, the energy retention was relatively poor. Twenty-four hours later, the sample was tested at the same dynamic impedance (125 ohms) and was found to have increased its energy storage capacity from 2 MJ/m$^3$ to 8 MJ/m$^3$. The average potential was 1.4 volts. Furthermore, the discharge curve of voltage versus time was much flatter than is usually observed for quinone-containing polymers, including liquor and other lignins which have not been treated with hydrazine.

EXAMPLE IV

An energy storage device was prepared as in Example III from one gram of black liquor treated by mixing with hydrazine monohydrate at a pH of 12.6. The liquor was titrated to the desired pH by addition of ten normal NaOH. Two milliliters of hydrazine were then added. The material was incubated at 60° C. for eighteen hours to remove excess water and allow the reaction mixture to reach equilibrium. In this example and in some following, the electronically active polymer was used in a variant form termed a composite material (abbreviated CM) which is a combination of polymer with an ohmic contact material, for instance, graphite powder. This composite structure increased surface area and stabilized the electronic properties, as well as improving mechanical behavior. The device was constructed from the combination of a graphite disc, the composite material, and separator in the order: graphite/CM/Separator/CM/graphite. The effect of adding graphite was to raise the potential to over 2 volts, lower the internal impedance to 5.7 ohms/cm$^2$, increase the energy density to over 25 MJ/cm$^3$, and slow internal discharge. This device ran a transistor radio at 10MA until the voltage dropped below the 2 V cutoff of the radio, at which time the device still contained over 80% of its charge. Short circuit current after charging was 185MA.

EXAMPLE V

An energy storage device was constructed using a commercial lignin known as Indulin AT (Polychemicals Department, Westvaco) which is a kraft pine lignin polymer. The device consisted of an zinc electron donor (32 mm disc), a ZnSO4 saturated Celgard film, and a 20% hydration lignin paste 0.05 mm thick as the electron acceptor. Tantalum discs, again 32 mm in diameter, formed the ohmic contacts. The device was charged and discharged (three times) until the voltage was stabilized and energy density raised, a procedure which has been found to be beneficial. The device then had an energy density of 150 MJ/m$^3$, and an average discharge voltage of 1.2 volts.

EXAMPLE VI

Lignin (Indulin AT) was packed in a tantalum foil envelope and heated to 1200° C. for three hours. The resulting product was a partly graphitized mass with improved mechanical properties and higher electrical conductivity. When tested as in Example V, it acted as an electron acceptor toward zinc and had an energy density of 200 MJ/m$^3$ at an average voltage of 1.0 volts.

EXAMPLE VII

Lignin (Indulin AT) was saturated with ammonia and packed in a tantalum foil envelope and heated at 1200° C. for four hours. The resultant product was found to function as an electron donor against the material in Example VI. Tested in the manner of Example V, with an electrolyte of NaOH, it produced an energy density of 80 MJ/m$^3$ at an average voltage of 0.9 volts.

EXAMPLE VIII

An energy storage device was constructed using Indulin AT as the electron acceptor. The lignin was dissolved in methyl alcohol and a graphite felt was saturated with the solution using a vacuum funnel. The felt was then dried in a vacuum at 60° C., rehydrated, and tested against a zinc electron acceptor with a Celgard film impregnated with zinc sulfate as an electrolyte. Due to the large increase in surface area for electron transfer, there was a corresponding improvement in charging/discharging kinetics and energy density. The energy density was approximately 200 MJ/m$^3$, and the average voltage 1.2 volts.

EXAMPLE IX

An energy storage device was constructed as in Example VI, charged, and then cooled to 10° C. The self-discharge rate decreased by 83%. Discharging the device through an external circuit at 10° C. reduced the discharge rate by 32%. This demonstrates that even though the low temperature charging/discharging characterisitics of lignin are superior to lead-acid systems, for example, there is a temperature dependence which can be used to lower the self-discharging life.

EXAMPLE X

A composite material (CM1) was formed by mixing one gram of black liquor with 1 ml of hydrazine monophosphate and incubating the mixture for three minutes. Graphite powder (500 mg) was mixed into the black liquor and hydrazine mixture. A second composite material (designated CM2) was formed by first mixing 1 mg of hydrazine monohydrate and 1 ml diethylamine. One gram of hydroquinone was then mixed into the solution and 300 mg of distilled water was added. The resultant chemical reaction raised the temperature from 25° C. to 46° C. Several energy storage devices were constructed with graphite as the ohmic contact and Celgard separators with the configuration: graphite/CM1/Separator/CM2/graphite. The energy content was highest with the CM1 as the cathode and CM2 as the anode. One energy storage device was reverse charged; that is, with CM1 the anode and CM2 the cathode. In both cases, the storage capacity continued to increase from twenty-four hours after initial charging. The device which was reverse charged was charged twenty-four hours later in the original charge configuration and found to store only approximately 24% of original capacity. This indicates that initial charging current, therefore, polarizes the energy storage devices which incorporate hydrazine.

In the previous descriptions, the results were obtained on developmental devices which used materials such as Teflon, tantalum, sealing materials, and so forth. These were used for better control and ease of testing and fabrication; for this reason they were not detailed, along with the test methods of data gathering and processing, as they are not pertinent to the operation of the devices.

One of the advantages of the present invention over the prior art is that both the electron acceptor component 15 and the electron donor component 17 can be made from the same organic semiconducting material. This confers advantages in processing and in stability. Cross-contamination is lessened when the anode and cathode are derived from the same material.

A further advantage of the present invention is that a readily available material, namely lignin, may be employed as the basis for one series of materials. This material is a by-product of the paper making industry and is frequently thought of as a waste product. In addition, the non-toxicity of lignin, as evidenced by its use in animal feed, is another distinct advantage. The energy storage material which, in the preferred embodiment, is treated in the manner described, is not suitable for use as food; however, it is clearly safe to handle. The energy storage materials are also chemically stable, lightweight and readily moldable to specific shapes.

In addition to the examples described above, experiments were conducted with the device of the present invention by titrating black liquor lignin with hydrochloric acid in order to determine the role of sulfur groups in energy storage devices. A precipitant was formed, along with the release of sulfur gas, as a result of the titration. The resulting polymer was markably reduced in energy storage capacity. Furthermore, it was noted that quinone polymers without sulfur or other anodic groups are also low in energy storage capacity. This phenomenon can be prevented by treatments which preserve the sulfur groups in the material. In such cases, titration with sulfuric acid allows protection if an acidic sample is required.

Finally, the graphite bonded by hydrazine allows the static dielectric constant to be reduced without appreciably lowering the impedence. Previously the static dielectric constant was lowered to prevent internal decay. Although internal decay could be drastically reduced, only a limited reduction could be achieved before the impedence became too high.

It will be appreciated that the structure illustrated in the drawing represents a single cell of an energy storage device and that such cells may be connected in series, in parallel or in any other manner in which individual cells are connected in conventional battery devices.

Having described several embodiments of a new and improved electrical energy storage device and method, it is believed that other modifications, variations and changes will be suggested to those skilled in the art in light of the above disclosure. It is therefore to be understood that all such variations, modifications and changes are believed to fall within the scope of the invention as defined by the appended claims.

What is claimed:

1. A rechargeable electrical energy storage device comprising:
   a first electrode;
   a component of electron acceptor material coupled to said first electrode;
   a second electrode;
   a component of electron donor material coupled to said second electrode; and
   ion-conducting solid-state barrier means coupled to both said components of electron acceptor and electron donor material for electrically separating said components and passing ions through said components;
   wherein at least one of said electron donor material and electron acceptor material includes lignin, an ohmic contact material, and a reducing agent for bonding the lignin to said ohmic contact material.

2. A rechargeable electrical energy storage device according to claim 1 wherein said electron acceptor material includes lignin mixed with a salt, and wherein said electron donor material includes lignin.

3. A rechargeable electrical energy storage device according to claim 2 wherein said salt is zinc chloride.

4. A rechargeable electrical energy storage device according to claim 1 wherein said electron acceptor material includes lignin mixed with a hydrazine, and wherein said electron donor material includes lignin.

5. A rechargeable electrical energy storage device according to claim 4 wherein said hydrazine is hydrazine-monohydrate.

6. A rechargeable electrical energy storage device according to claim 4 wherein said first and second electrodes are graphite.

7. A rechargeable electrical energy storage device according to claim 4 wherein said electron acceptor material is a mixture of approximately 1:1.5 by weight of lignin at a pH of approximately 10.6 and hydrazine-monohydrate.

8. A rechargeable electrical energy storage device according to claim 1 wherein said electron acceptor material and said electron donor material are both a mixture of lignin and hydrazine.

9. A rechargeable electical energy storage device according to claim 1 wherein said electron acceptor material includes lignin and said electron donor material includes zinc.

10. A rechargeable electrical energy storage device according to claim 9 wherein said electron acceptor material includes lignin having a 20% hydration, and wherein said barrier means is a film of plastic material impregnated with zinc sulfate.

11. A rechargeable electrical energy storage device according to claim 9 wherein said electron acceptor material is lignin that has been partially graphitized by heating.

12. A rechargeable electrical energy storage device according to claim 1 wherein said electron acceptor material is lignin that has been graphitized by heating, and wherein said electron donor material is a mixture formed by heating lignin saturated with ammonia.

13. A rechargeable electrical energy storage device according to claim 1 wherein said electron acceptor material is a mixture formed by dissolving lignin in methyl alcohol.

14. A rechargeable electrical energy storage device according to claim 13 wherein said electron donor material is zinc.

15. A rechargeable electrical energy storage device according to claim 1 wherein said barrier means includes a film of plastic material impregnated with an electrolyte.

16. A rechargeable electrical energy storage device according to claim 1 wherein said electrolyte is zinc sulfate.

17. A rechargeable electrical energy storage device according to claim 1 wherein said one of said acceptor and donor materials is a mixture of lignin, hydrazine monophosphate and graphite.

18. A rechargeable electrical energy storage device according to claim 17 wherein the other of said acceptor and donor materials is a mixture of hydrazine monohydrate, diethylamine and hydroquinone.

19. A rechargeable electrical energy storage device according to claim 1 wherein said one of said acceptor and donor materials is a mixture of hydrazine monohydrate, diethylamine and hydroquinone.

20. A rechargeable electrical energy storage device according to claim 1 wherein said reducing agent is 2, 4-dinitrophenyl hydrazine.

21. A composition of matter comprising a mixture for storing electrical energy, said mixture including lignin polymer material, a hydrazine compound, and graphite.

22. A composition of matter according to claim 21 wherein said hydrazine compound is hydrazine monohydrate.

23. A composition of matter according to claim 21 wherein said hydrazine compound is hydrazine monophosphate.

24. A composition of matter according to claim 21 wherein said polymer material is formed by dissolving lignin in methyl alcohol.

25. A rechargeable electrical energy storage device comprising:
   a pair of spaced electrodes; and
   storage means sandwiched between said electrodes for storing electrical energy in response to passage of electrical current therethrough, said storage means comprising a mixture of:

an oxidation reduction polymer material;
an ohmic contact material; and
reducing agent means for adding electron-repelling groups to the polymer material to render the polymer material more anodic and for facilitating molecular connection between the polymer and ohmic contact materials.

26. The device according to claim 25 wherein said polymer material is lignin.

27. The device according to claim 25 wherein said ohmic contact material is graphite.

28. The device according to claim 25 wherein said reducing agent means is a hydrazine compound.

29. The device according to claim 28 wherein said polymer material is lignin.

30. The device according to claim 29 wherein said ohmic contact material is graphite.

31. The device according to claim 28 wherein said ohmic contact material is graphite.

32. The device according to claim 25 wherein said polymer material is lignin and said ohmic contact material is graphite.

* * * * *